M. W. ROGERS.
INNER TUBE PROTECTOR FOR CLINCHER RIMS.
APPLICATION FILED JULY 16, 1921.
1,406,687.
Patented Feb. 14, 1922.
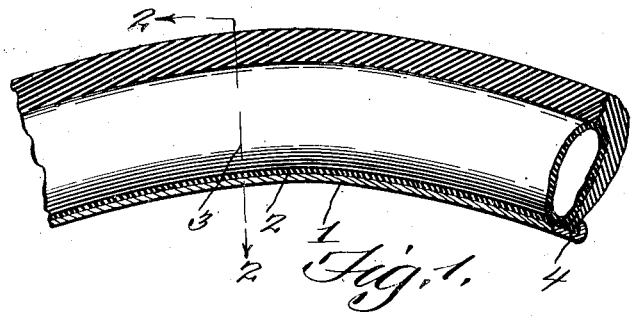
Fig. 1.
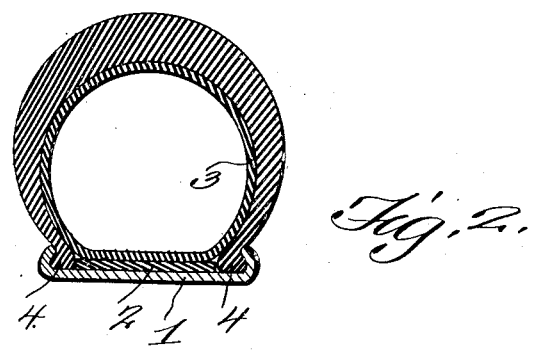
Fig. 2.
Fig. 3.
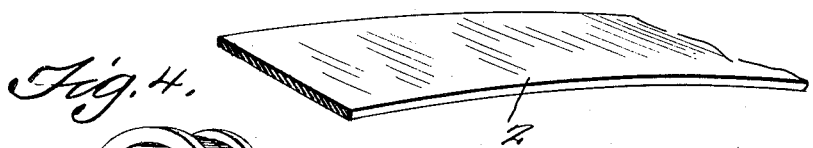
Fig. 4.
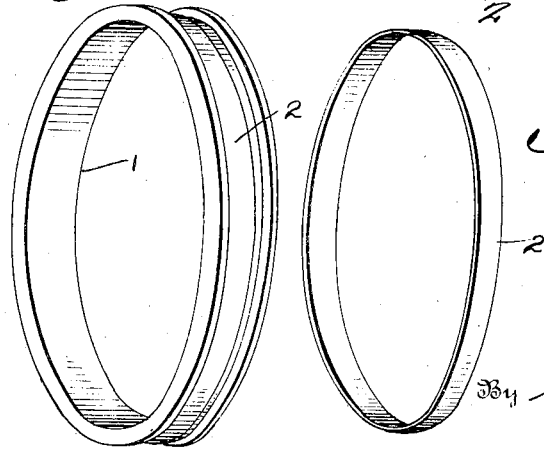
Fig. 5.
Inventor
M. W. Rogers,
By Watson E. Coleman,
Attorney

UNITED STATES PATENT OFFICE.

MILTON W. ROGERS, OF LIVE OAK, FLORIDA.

INNER-TUBE PROTECTOR FOR CLINCHER RIMS.

1,406,687.  Specification of Letters Patent.  Patented Feb. 14, 1922.

Application filed July 16, 1921. Serial No. 485,260.

*To all whom it may concern:*

Be it known that I, MILTON W. ROGERS, a citizen of the United States, residing at Live Oak, in the county of Suwanee and State of Florida, have invented certain new and useful Improvements in Inner-Tube Protectors for Clincher Rims, of which the following is a specification, reference being had to the accompanying drawings.

It has been found that it does not take long for bumps to form on the outer surfaces of automobile wheel rims. Very often there are rough places on the rims, and others have rivets all of which act to cut or wear holes in the inner tube of the tire. It is, therefore, the purpose of the present invention to provide a protector, such as a rubber band, which, when manufactured may be made of any suitable material, preferably a cheap grade of rubber. In repair shops and the like, protectors of this character can be cut from discarded inner tubes. The protecting band is designed to fit the rim in tight surrounding relation thereon, between the tire retaining clincher flanges, to protect the inner tube and prevent wearing or cutting of holes thereinto.

It is well known that there has been used what is called, a "floating flap," preferably carried by the tire, but which cannot be used successfully on clincher rims, because such flaps are made of fabric and will not stretch over the clincher flanges of the rim. Furthermore should a "floating flap" be used on a clincher rim, it will twist, kink and pinch the inner tube, thereby further rendering the "floating flap" an unsuccessful protector. In view of these facts it has been necessary and essential to use a band or protector between the rim and the inner tube, to protect the tube from the rust, rivets or other rough places, especially on clincher rims.

Therefore another purpose is to provide a band or protector of the present general character cut from a discarded inner tube, though it may be otherwise constructed, therefore providing a more efficient, cheap and practical protector, which may be sold at a reasonable profit, especially in tire repairing shops. A protector of this kind will last as long as the average tire, when taking off one rim and putting on another, and simpler in every respect than the so called "floating flap," as it is unnecessary to apply them between the tire and the inner tube. In repairing an inner tube, the tire may be removed, the protecting band applied to the rim, and then when the inner tube and tire are placed on the rim, the protecting band will act to protect the inner tube from the rusty or rough places on the rim as well as loosely projecting rivets. Though the present protector is especially adapted for clincher flanges of the Ford type, it is obvious that it may be employed with equal success on other makes of rims.

While the design and construction at present illustrated and set forth are deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view of a rim and the tire thereon, showing a part of the flanges, showing the inner tube, and illustrating the location of the protecting band;

Figure 2 is a cross sectional view on line 2—2 of Figure 1, wherein the location of the protector or band is shown as engaging between the inner edges of the margins of the clincher flanges of the tire, so as to provide a relatively even surface for engagement with the inner tube; and Figure 3 is a detail perspective view of a section of the protector 2;

Figure 4 is a detail perspective view of a clincher rim showing the protector for inner tubes applied; and Figure 5 is a detail perspective view of the elastic protector.

Referring to the drawings, 1 designates a rim of the general construction, especially of the clincher flange type though it is obvious that others may be employed, and 2 denotes a band or protector, which fits tightly in surrounding relation to the outer surface of the rim between the tire retaining flanges. The edges of the band or protector contact with the adjacent margins or edges of the clincher flanges of the tire, thereby providing a relatively uninterrupted even surface to be engaged by the inner tube 3. In other words the opposite edges of the protector or band are spaced from the inner surface of the tire retaining flanges, so as to permit the clincher flanges 4 of the tire to engage between the opposite edges of the band and the tire retaining flanges of the rim.

The invention having been set forth, what is claimed as being new and useful is:

The combination with a wheel and a tire engaged therewith in engagement with the tire retaining flanges of the rim, of a protecting expansible single ply endless band fitting in surrounding relation upon the outer surface of the rim, thereby providing an uninterrupted even surface, with which the inner tube engages, to protect the tube from rough places on the rim, said band having opposite abrupt abutment edges with which the opposite margins or edges of the tire abut, said band being of a width to engage between said margins or edges of the flanges of the tire, whereby said abrupt abutment edges of the band may hold the tire clincher flanges in engagement with the tire engaging clincher flanges of the rim, and thereby preventing inward collapsing of the opposite sides of the tire.

In testimony whereof I hereunto affix my signature.

MILTON W. ROGERS.